US012567341B2

(12) United States Patent
Du Chalard

(10) Patent No.: US 12,567,341 B2
(45) Date of Patent: Mar. 3, 2026

(54) ORIENTATION ASSISTANCE SYSTEM

(71) Applicant: Artha France, Versailles (FR)

(72) Inventor: Rémi Du Chalard, Versailles (FR)

(73) Assignee: Artha France, Versailles (FR)

( * ) Notice: Subject to any disclaimer, the term of this patent is extended or adjusted under 35 U.S.C. 154(b) by 1028 days.

(21) Appl. No.: 17/753,624

(22) PCT Filed: Sep. 3, 2020

(86) PCT No.: PCT/FR2020/051528
§ 371 (c)(1),
(2) Date: Apr. 19, 2022

(87) PCT Pub. No.: WO2021/048485
PCT Pub. Date: Mar. 18, 2021

(65) Prior Publication Data
US 2022/0343795 A1      Oct. 27, 2022

(30) Foreign Application Priority Data

Sep. 11, 2019    (FR) ...................................... 1910007

(51) Int. Cl.
*G09B 21/00*        (2006.01)
*G06F 3/01*          (2006.01)
*G06T 19/00*        (2011.01)
(52) U.S. Cl.
CPC ........... *G09B 21/004* (2013.01); *G06F 3/016* (2013.01); *G06T 19/006* (2013.01)
(58) Field of Classification Search
CPC ...... G09B 21/004; G06F 3/016; G06T 19/006
See application file for complete search history.

(56) References Cited

U.S. PATENT DOCUMENTS 8,388,346 B2 * 3/2013 Rantala ................ G09B 21/003
434/114
2003/0063776 A1 4/2003 Sato
(Continued)

FOREIGN PATENT DOCUMENTS

CN            1404806 A        3/2003
JP        2002-065721 A        3/2002
(Continued)

OTHER PUBLICATIONS

Indian Office Action for Application No. 202227015700 dated Dec. 28, 2023, 7 pages.
(Continued)

*Primary Examiner* — Dmitry Suhol
*Assistant Examiner* — Alyssa N Brandley
(74) *Attorney, Agent, or Firm* — TraskBritt

(57)                ABSTRACT
An orientation assistance system comprises acquisition means for acquiring a real or virtual visual environment, non-visual human/machine interface means, and processing means for processing the digital representation of the visual environment to provide an electrical control signal for controlling a non-visual interface. The human/machine interface means comprise a bracelet having a haptic region with a surface area of between 60×60 millimeters and 150×150 millimeters, with a set of N×M active spikes, where N is between 5 and 100 and M is between 10 and 100. The processing means for processing the digital representation is configured to periodically extract at least one pulsed digital activation pattern of a subset of the spikes of the haptic region.

14 Claims, 2 Drawing Sheets

(56)                   References Cited

U.S. PATENT DOCUMENTS

| | | | |
|---|---|---|---|
| 2013/0093852 A1 | 4/2013 | Ye | |
| 2015/0125831 A1 | 5/2015 | Chandrashekhar Nair et al. | |
| 2015/0277563 A1* | 10/2015 | Huang | G06F 1/1694 |
| | | | 715/702 |
| 2016/0018890 A1* | 1/2016 | Deokar | G06F 3/0488 |
| | | | 715/702 |
| 2017/0148281 A1* | 5/2017 | Do | B06B 1/045 |
| 2018/0189567 A1 | 7/2018 | Maheriya et al. | |
| 2018/0321056 A1* | 11/2018 | Yoo | A61H 3/061 |
| 2019/0272427 A1* | 9/2019 | Yin | G06V 20/20 |
| 2021/0342007 A1* | 11/2021 | Xu | G10L 21/16 |

FOREIGN PATENT DOCUMENTS

| | | |
|---|---|---|
| JP | 2003-079685 A | 3/2003 |
| JP | 2004-024853 A | 1/2004 |
| JP | 2019-152953 A | 9/2019 |
| KR | 10-1663824 B1 | 10/2016 |
| WO | 2019/102968 A1 | 5/2019 |

OTHER PUBLICATIONS

International Search Report for Application No. PCT/FR2020/051528 dated Dec. 23, 2020, 2 pages.
International Written Opinion for Application No. PCT/FR2020/051528 dated Dec. 23, 2020, 6 pages.
Japanese Notice of Reasons for Refusal for Japanese Application No. 2022-516193, dated Jun. 25, 2024, 13 pages with English translation.
Japanese Office Action for Application No. 2022-516193 dated Jun. 17, 2024, 16 pages with machine translation.

* cited by examiner

ORIENTATION ASSISTANCE SYSTEM

CROSS-REFERENCE TO RELATED APPLICATIONS

This application is a national phase entry under 35 U.S.C. § 371 of International Patent Application PCT/FR2020/051528, filed Sep. 3, 2020, designating the United States of America and published as International Patent Publication WO 2021/048485 A1 on Mar. 18, 2021, which claims the benefit under Article 8 of the Patent Cooperation Treaty to French Patent Application Serial No. 1910007, filed Sep. 11, 2019.

TECHNICAL FIELD

The present disclosure relates to the field of orientation assistance for visually impaired people, or people moving around in environments having very low visibility, for example, firemen moving around in a smoke-filled building, or soldiers moving around in the dark.

BACKGROUND

Various solutions are known, ranging from guide dog assistance to marking the ground with orientation assistance strips, implanting sound beacons, or indeed canes allowing for detection of the obstacles.

More recently, GPS applications have also been developed, which allow blind and partially sighted people to become more independent in their movements, by giving them the roads, the points of interest located there, the crossroads, the bus stops, etc. They allow the user of the GPS application to receive, in real time, via an oral notification on their smartphone, information relating to bus times, and which tells them their stop, and gets them where they want to go once they have gotten off the transport. During their journey, ad hoc information is provided, in order that the user does not get lost, avoids obstacles, does not encounter difficulties, and gets on the correct bus.

It has also been proposed to use haptic information transmission, for example, in the form of a fitness tracker. The haptic technology uses the sense of touch in order to convey an item of information. The company WearWorks proposes a smart bracelet called "Wayband" for guiding blind people. The user starts by downloading an application onto an associated smartphone, and states the desired address. The bracelet connected to a GPS system guides the user to their destination. When the user makes a mistake on their route, the bracelet vibrates. It stops vibrating once on the correct path. The tactile language, which is sensitive, more intuitive, and unintrusive, relieves the hearing, which is a sense that is over-used by partially sighted persons.

Another solution marketed by the company SUNU relates to a bracelet using high-frequency waves in order to facilitate echolocation in space.

U.S. Patent Application No. US20180189567A1 is known, relating to a system for assisting blind people, comprising a plurality of video cameras and a haptic band worn by the user, comprising a plurality of (two or more) haptic transducers that are spaced at a distance. The haptic band is worn such that the user's hands are free for other tasks. The system uses its video camera, its depth processing algorithms, and its object recognition algorithms (hardware and/or software) in order to identify a limited number of objects that are important for navigation. The locations in space of each object considered important are provided to the user by varying the output toward the haptic transducers, accordingly. The system is designed to identify and indicate the objects as generic objects, identified objects, and the objects of potential obstacles. The system can also optionally provide audio information or tactile graphical display information also relating to these objects.

This solution is not satisfactory, because the multiple transducers act on different parts of the body, which does not allow for intuitive and simple understanding of the information, and requires significant attention in order to distinguish the deformations of the bearing regions of the transducers.

U.S. Patent Application No. US20150125831A1 describes another example of a solution comprising a set of cameras that can sense an image ahead, by virtue of which the image is processed and used to output a three-dimensional representation of the image on the array of tactile pins. This makes it possible to recognize objects and obstacles in the region located in front of the device, while the pin array can also be used as an adaptive braille reader. An assembly of specific pins is envisaged, using a step micromotor, while the global system provides a plurality of functions for partially sighted users, including capacities of navigation, facial recognition, connection to wireless networks, and various input/output means.

The solutions of the prior art are not suitable for transmitting rich and comprehensive information relating to a visual environment, in tactile form.

The haptic information is generally too basic and poorly suited to understanding of a complex environment in a manner sufficiently complete to represent a real orientation aid.

BRIEF SUMMARY

In order to overcome these disadvantages, the present disclosure relates, according to the most general meaning thereof, to an orientation assistance system comprising acquisition means for acquiring a real or virtual visual environment, non-visual human/machine interface means and processing means for processing the digital representation of the visual environment in order to provide an electrical control signal for controlling a non-visual interface. The human/machine interface means comprise a bracelet having a single haptic region having a surface area of between 60×60 millimeters and 150×150 millimeters, with a set of N×M active spikes, where N is between 5 and 100 and M is between 10 and 100. The processing means for processing the digital representation is configured to periodically extract at least one pulsed digital activation pattern of a subset of the spikes of the haptic region.

Advantageously, the acquisition means comprise at least one image sensor that can be carried by the wearer of the bracelet, and processing means for generating a digital depth map. The image sensor may be formed by a stereoscopic camera or a single camera with processing of consecutive images in order to determine a depth map, or indeed a 3D scanner, or a LIDAR for providing a point cloud.

According to a particular embodiment, the digital representation processing means are calculated depending on a representation model selected from a series of different representation models. The different models make it possible to provide processing suitable for particular contexts, for example, the transmission of information on a trajectory, or a haptic representation of an environment and its points of interest, or a perception of surrounding volumes, and to allow the user to select one of these modes of information, depending on their needs and preferences, or indeed to automate the selection by way of learning algorithms. According to a variant, the system further comprises a server that is capable of communicating with each of the individual items of equipment in order to receive the geolocated acquisition data of the digital environment and storage data of a geolocated digital model of the environment, and of transmitting the digital model to an individual item of equipment, depending on the position thereof.

This variant makes it possible to reduce the calculation processing from the acquired images, and to share the useful information between the various users who have passed through the environment.

According to a particular embodiment, the processing means for processing the digital representation are designed to periodically extract a sequence of successive pulsed digital activation patterns of a subset of the spikes of the haptic region, in order to provide progressive haptic information during a time period.

According to a variant, one of the digital patterns includes a pulsed activation command for an alignment of spikes, forming, together with a reference axis of the bracelet, an angle that corresponds to the direction of movement with respect to the reference direction of the visual environment.

According to another variant, one of the digital patterns includes a pulsed activation command for a configuration of spikes corresponding to a projection in the horizontal plane of the main points of interest of the digital representation of the visual environment.

According to a particular embodiment, the pulsed digital activation pattern model of a subset of the spikes of the haptic region is determined on the basis of the membership of the visual environment to a prerecorded class of environments.

Advantageously, the pulsed digital activation pattern model of a subset of the spikes of the haptic region is determined on the basis of the level of experience of the user.

BRIEF DESCRIPTION OF THE DRAWINGS

The present disclosure will be more clearly understood upon reading the following detailed description of a non-limiting embodiment of the present disclosure, with reference to the accompanying drawings, in which.

DETAILED DESCRIPTION

General Description of the Hardware Architecture

Figure 1:
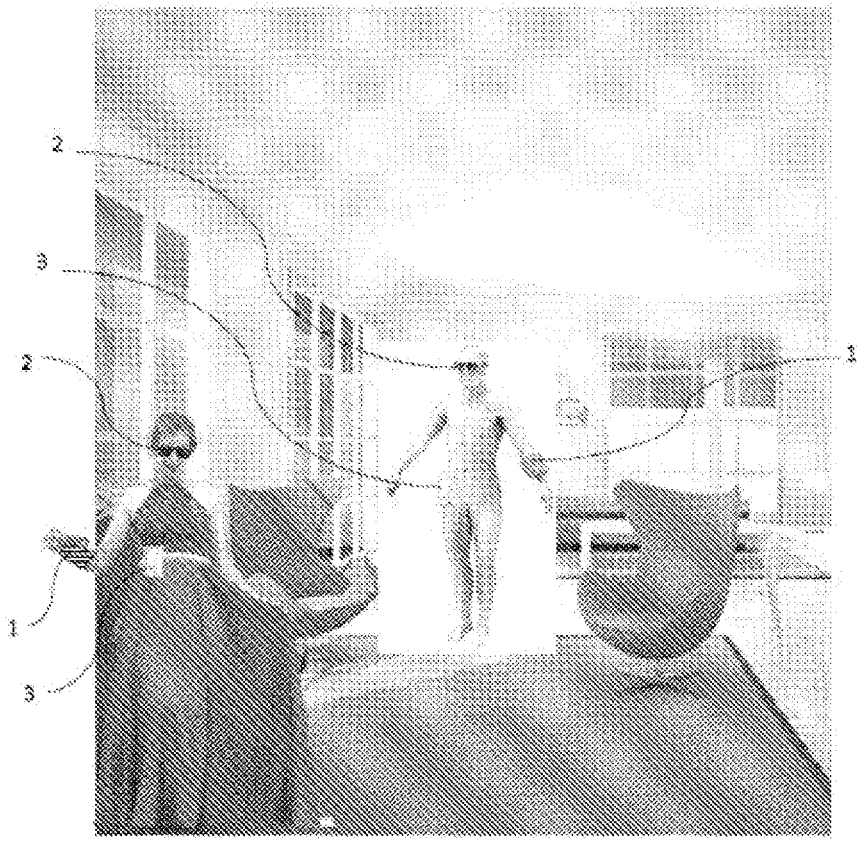
FIG. 1 is a schematic view illustrating an environment in which embodiments of the present disclosure may be employed.

Referring to FIG. 1, the individual components of the system according to the present disclosure comprise a bracelet (1) worn on the user's forearm, or optionally in the femoral position, a frame (2), which, in the embodiment described, is in the form of a spectacle frame, provided with image sensors, for example, in the extension of each branch, in order to provide a stereoscopic image. The frame (2) is equipped with a georeferencing or geolocation sensor, and/ or a module that provides an indication of the orientation of the frame with respect to magnetic north.

These various elements communicate in BLE Bluetooth mode, with the smartphone (3) of the user with which they are paired. The smartphone (3) ensures some of the computer processing by way of an application and communication with a server via radiofrequency communication of the 3G, 4G or 5G type, or Wi-Fi.

Of course, the smart phone (3) could be replaced by a computer, a tablet, and more generally a calculator.

Description of the Bracelet

Figure 2:
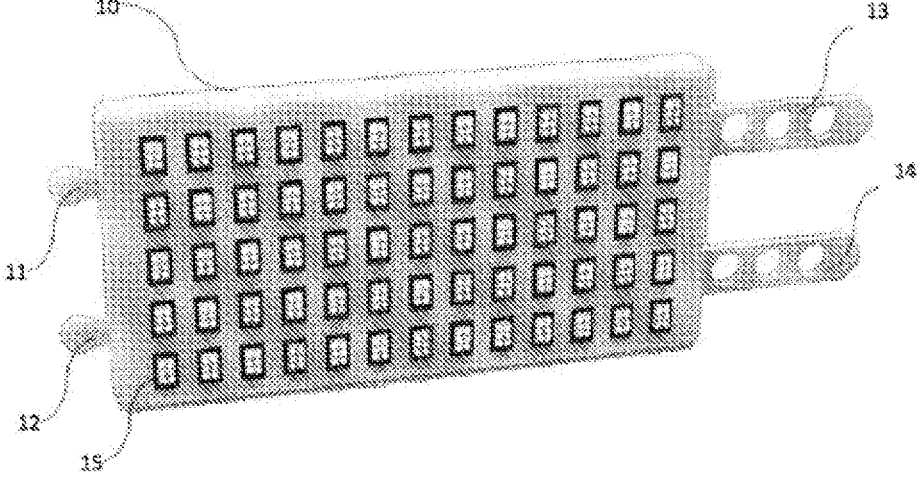
FIG. 2 shows the inner surface of a bracelet according to the present disclosure.

FIG. 2 shows an embodiment of a bracelet for implementing the present disclosure.

It comprises a flexible shell (10) provided with straps (11, 12, 13, 14) for fixing around the forearm (or optionally around the lumbar region).

The bracelet comprises a matrix of 5×12 spikes (15) that can each be activated in a pulsed manner, between a retracted rest position and a pulsed erected position, for a fraction of a second in the case of activation of an electromagnetic actuator by way of an electrical signal.

The configuration of the haptic surface is not limited to a rectangular zone having a regular distribution of spikes (15).

Digital Processing

Figure 3:
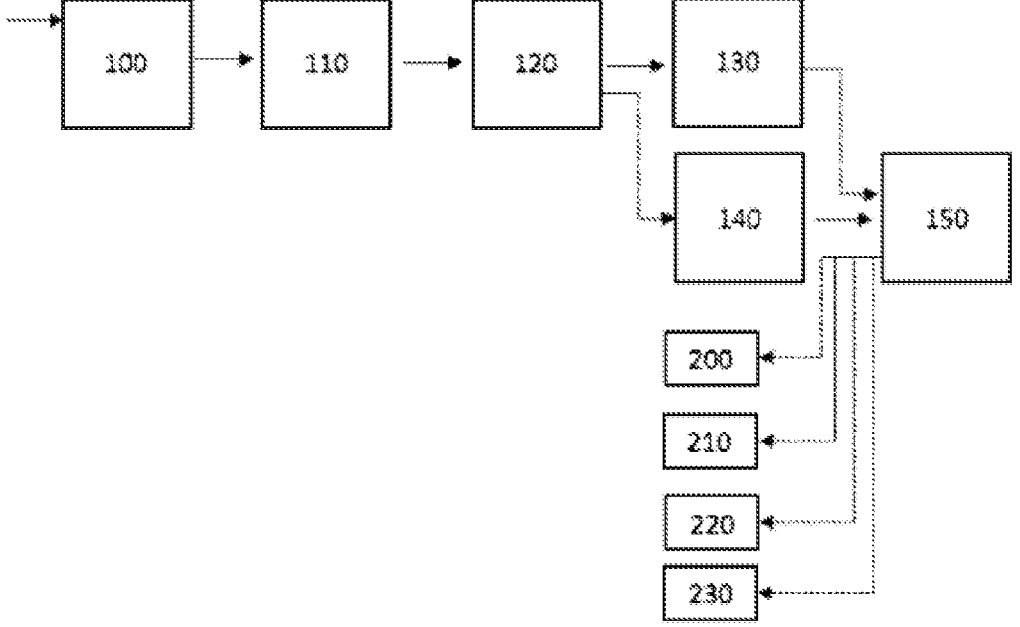
FIG. 3 shows the functional architecture of an embodiment of the present disclosure.

FIG. 3 shows the functional architecture of the apparatus. The first step (100) involves acquiring two streams of synchronized images, using two laterally offset sensors, on the user's frame (2).

This pair of sensors forms a stereoscopic camera, which camera is oriented toward the scene that the user could see.

This camera is connected via a radio frequency link to the smartphone (3) comprising a calculation unit that allows for the processing (110) of the images originating from the two sensors. This processing makes it possible to calculate the depth map from the two images, as well as the position of the camera in space. The camera can also be connected to a computer or a smartphone via a wireless (Bluetooth®, Wi-Fi, etc.) or wired connection.

One possible method of image processing is a succession of algorithms making it possible to extract the depth map of the scene and then to use this result with the associated left-hand and right-hand images in order to deduce therefrom the change in position and orientation of the camera between two consecutive recording moments (typically separated by a sixtieth of a second).

Two processes then take place.

First, a software module (120) controls the recording of images or visible features constituting points of interest, and the storing, in the memory, of the position of the frame (2) at the moment of the points being observed. The module provides a database of points of interest, which is transmitted by the user's telephone (3) to a server that stores the geolocated data in a database that is shared among all the users.

Storage of a new entry in the database thus formed is preferably triggered depending on a collection criterion that determines the amount of redundant information with the other entries of the database. Other criteria may be used, such as manual triggering of storage by the user, the calculation of a physical distance between each position of points of interest, or a period of time that has elapsed between two instances of storage.

A database E1 is thus constructed (130). It contains a set of reference positions associated with features or images. It also serves, during the use of a system in the same region, to relocate the frame (2).

In parallel, a software module (140) calculates a depth map, and the parameters of the stereoscopic system are used to generate a point cloud, by projecting each pixel of the image in order to obtain coordinates of points in space. The points in space then undergo a change of reference frame by using the information relating to the position of the headset in space, the information originating from the odometry module C1, in order to place all the points sensed during the initialization phase in a common fixed reference frame.

These sets of points are merged in order to create a dense model (cartography) of the operating region, while reducing the amount of redundant information.

This process can be carried out, for example, by passing through all the points and merging the points identified as being close to one another, depending on a distance, or indeed using a truncated signal distance function (TSDF) volume.

A subsequent step (150) involves generating a network in the set of points, in three dimensions. The network is made up of connected triangles, modeling the surfaces of the operating regions.

This set of points (voxels) subsequently undergoes processing in order to calculate the activation patterns for the spikes (15) of the bracelet (1).

In order to achieve this, the system comprises a library of different processing options.

A first method of processing (200) involves determining a movement direction or a simplified trajectory, in the form of consecutive segments calculated on the basis of the voxels corresponding to obstacles, and the orientation of which is recalculated, with respect to the direction of the frame (2). The result is an activation pattern of the spikes that is recalculated periodically, for example, once per second, in order to haptically transmit the direction or the trajectory to follow.

A second method of processing (210) involves calculating a projection on a horizontal plane of the voxels in order to determine a low-resolution digital map (resolution according to the number of spikes), and in applying, to the bracelet, pulsed patterns corresponding to the map, oriented depending on the direction of the frame (2).

A third method of processing (220) involves calculating consecutive transverse planes, and in transmitting sequences of patterns corresponding to low-resolution transverse planes, at a temporal succession that is representative of the spacing along the longitudinal axis, perpendicular to the transverse planes. Thus, bursts of patterns, spaced apart by rest periods, are applied to the spikes, allowing the user to identify the formation of their environment by the succession of tactile sensations.

A fourth method of processing (230) involves calculating a low-definition black and white image of the stereoscopic image, and in calculating a pattern on the basis of the low-definition image, to control the periodic activation of the spikes (15).

The selection of one of the methods of processing (200 to 230) may be performed by the user, by manual or voice control. It can also be performed automatically, depending on the type of environment (obstacle density, environment already known vs. new environment, etc.), or depending on the user's level of learning, some methods of processing requiring greater sensitivity and experience than others.

According to a variant, the bracelet computer will be connected by cable, Bluetooth, or Wi-Fi. The connection of the computer to the servers will be performed by Wi-Fi, or 3G, 4G or 5G.

The invention claimed is:

1. An orientation assistance system, comprising: acquisition means for acquiring a real or virtual visual environment and non-visual human/machine interface means, the system configured for processing a digital representation of the visual environment to provide an electrical control signal for controlling a non-visual interface, wherein: the human/machine interface means comprises a bracelet having a haptic interface consisting essentially of a single haptic region located on an inner surface of the bracelet, the single haptic region having a surface area of between 60×60 millimeters and 150×150 millimeters, with a set of N×M active spikes, where N is between 5 and 100 and M is between 10 and 100; the processing the digital representation comprises periodically extracting at least one pulsed digital activation pattern of a subset of the spikes of the haptic region, wherein the pulsed digital activation pattern is determined on a basis of a level of experience of a user.

2. The system of claim 1, wherein the acquisition means comprises: at least one image sensor configured to be carried by a wearer of the bracelet, and a depth-map processing device for generating a digital depth map.

3. The system of claim 2, wherein the digital representation is calculated depending on a representation model selected from a series of differentiated representation models.

4. The system of claim 3, further comprising a server configured to communicate with individual items of equipment of the system to receive geolocated acquisition data of a digital environment and storage data of a geolocated digital model of the environment, and to transmit the digital model to an individual item of equipment of the individual items of equipment, depending on the position thereof.

5. The system of claim 4, wherein the processing the digital representation comprises periodically extracting a sequence of successive pulsed digital activation patterns of a subset of the spikes of the haptic region to provide progressive haptic information during a time period.

6. The system of claim 5, wherein one of the digital activation patterns includes a pulsed activation command for an alignment of spikes, forming, together with a reference axis of the bracelet, an angle that corresponds to a direction of movement with respect to the reference direction of the visual environment.

7. The system of claim 6, wherein one of the digital activation patterns includes a pulsed activation command for a configuration of spikes corresponding to a projection in the horizontal plane of main points of interest of the digital representation of the visual environment.

8. The system of claim 7, wherein a pulsed digital activation pattern model of a subset of spikes of the haptic region is determined on the basis of membership of the visual environment to a prerecorded class of environments.

9. The system of claim 1, wherein the digital representation is calculated depending on a representation model selected from a series of differentiated representation models.

10. The system of claim 1, further comprising a server configured to communicate with individual items of equipment of the system to receive geolocated acquisition data of a digital environment and storage data of a geolocated digital model of the environment, and to transmit the digital model to an individual item of equipment of the individual items of equipment, depending on the position thereof.

11. The system of claim 1, wherein the processing the digital representation comprises periodically extracting a sequence of successive pulsed digital activation patterns of a subset of the spikes of the haptic region to provide progressive haptic information during a time period.

12. The system of claim 1, wherein one of the at least one digital activation pattern includes a pulsed activation command for an alignment of spikes, forming, together with a reference axis of the bracelet, an angle that corresponds to a direction of movement with respect to the reference direction of the visual environment.

13. The system of claim 1, wherein one of the at least one digital activation pattern includes a pulsed activation command for a configuration of spikes corresponding to a projection in the horizontal plane of main points of interest of the digital representation of the visual environment.

14. The system of claim 1, wherein a pulsed digital activation pattern model of a subset of spikes of the haptic region is determined on the basis of membership of the visual environment to a prerecorded class of environments.

\* \* \* \* \*